(12) United States Patent
Huang et al.

(10) Patent No.: US 8,054,917 B2
(45) Date of Patent: Nov. 8, 2011

(54) METHOD AND APPARATUS FOR ADVANCED INTER-CARRIER INTERFERENCE CANCELLATION IN ORTHOGONAL FREQUENCY DIVISION MULTIPLEXING (OFDM) CHANNELS

(75) Inventors: Feng Huang, Hoffman Estates, IL (US); Yan Li, Newtown, PA (US); Azzedine Touzni, Algonquin, IL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 680 days.

(21) Appl. No.: 12/170,898

(22) Filed: Jul. 10, 2008

(65) Prior Publication Data
US 2010/0008433 A1  Jan. 14, 2010

(51) Int. Cl.
*H04L 27/06* (2006.01)
(52) U.S. Cl. .......................... 375/340; 375/224; 370/203
(58) Field of Classification Search ............... 375/224, 375/285, 316, 340, 346; 370/203, 206
See application file for complete search history.

(56) References Cited

U.S. PATENT DOCUMENTS
| | | | | |
|---|---|---|---|---|
| 6,061,327 | A * | 5/2000 | Demoulin et al. | 370/208 |
| 7,583,755 | B2 * | 9/2009 | Ma et al. | 375/316 |
| 7,876,847 | B2 * | 1/2011 | Graef et al. | 375/262 |
| 2008/0008258 | A1 * | 1/2008 | Tanabe | 375/267 |

OTHER PUBLICATIONS

Dietl, "Conjugate Gradient Implementation of Multi-Stage Nested Wiener Filter for Reduced Dimension Processing," Munich University of Technology, Institute for Circuit Theory and Signal Processing (2001).
Goldstein et al., "Reduced-Rank Adaptive Filtering," IEEE Transactions on Signal Processing, vol. 45, No. 2 (Feb. 1997).
Simeone et al., "Pilot-Based Channel Estimation for OFDM Systems by Tracking the Delay-Subspace," IEEE Transactions on Wireless Communications, vol. 3, No. 1 (Jan. 2004).
Tang et al., "Pilot Assisted Time-Varying Channel Estimation for OFMD Systems," IEEE Transactions on Signal Processing, vol. 55, No. 5 (May 2007).

* cited by examiner

*Primary Examiner* — Jean B Corrielus
(74) *Attorney, Agent, or Firm* — Volpe and Koenig, P.C.

(57) ABSTRACT

A method of estimating a time variant Orthogonal Frequency Division Multiplexing (OFDM) while eliminating Inter-carrier Interference (ICI) is disclosed, where the time variant channel matrix is estimated at channel taps using a Basis Expansion Model (BEM). The BEM method decomposes the time variant channel into a group of basis functions in the frequency domain. Coefficients are estimated using a subspace tracking algorithm that decreases the dimensions of the coefficient matrix allowing for simpler calculation of the estimated signal. The coefficients matrix is estimated using a conjugate gradient iterative method that may be stopped after 6-8 iterations to arrive at an acceptable estimation. Finally, the transmitted data is estimated, again using the conjugate gradient method iteratively, wherein the conjugate gradient method is stopped after a small number of iterations.

29 Claims, 4 Drawing Sheets

METHOD AND APPARATUS FOR ADVANCED INTER-CARRIER INTERFERENCE CANCELLATION IN ORTHOGONAL FREQUENCY DIVISION MULTIPLEXING (OFDM) CHANNELS

FIELD OF INVENTION

The present invention relates to wireless communications. More particularly, the present invention relates to Orthogonal Frequency Division Multiplexing (OFDM).

BACKGROUND

Orthogonal Frequency Division Multiplexing (OFDM) is a multi-carrier modulation scheme. Data is modulated into a number of separate, orthogonal signal frequencies and a portion of the data is transmitted on each of these frequencies, each known as a carrier. This scheme provides benefits over single carrier methods that are subject to interference and channel fading. OFDM transmits data through a multitude of carriers, thereby preventing channel conditions from affecting the whole signal. Additionally, the same amount of data may be transmitted at a lower symbol rate in OFDM, thereby reducing the effects of inter-symbol interference (ISI) caused by channel variations between symbols with the use of a guard interval that prevents delayed signals from interfering with a current symbol.

Referring to FIG. 1, an overview of a conventional OFDM system is shown. A coded, modulated symbol 101 is transmitted in the frequency domain. An Inverse Fast Fourier Transform IFFT 105 is used to transform the data sequence S(k) 101 of length N from the frequency domain into a time domain signal x(n) 107.

$$x(n) = \sqrt{N} \sum_{n=0}^{N-1} S(k) e^{j\frac{2\pi}{N}nk} \quad \text{Equation (1)}$$

The guard interval with Length $N_g$, chosen to be larger than the expected channel delay spread, is inserted into the beginning of the symbol 109. The transmitted signal $x_d(n)$ 111, will be transmitted through a linear time variant channel 113. The time variant channel 113 is modeled by the time-variant discrete impulse response h(n,l), defined as the time, n, response to an impulse applied at time n-l. Assume the maximum channel delay $N_h \leq N$, the received signal at the receiver, $y_d(n)$ 115 may be represented as:

$$y_d(n) = \sum_{l=0}^{N_h-1} h(n,l) x_d(n-l) + w(n), \quad \text{Equation (2)}$$
$$0 \leq n \leq N$$

Where the w(n) 117 is the white Gaussian noise with variance $\sigma^2$. After removal of the guard interval 119 at the beginning, the received signal sequence y(n) 121 will be passed to an N-points Fast Fourier Transform (FFT) 123 converting the received time domain signal 121 back to the frequency domain received signal Y(k) 125.

$$Y(k) = \frac{1}{\sqrt{N}} \sum_{n=0}^{N-1} y(n) e^{-j\frac{2\pi}{N}nk} \quad \text{Equation (3)}$$

As will be explained in more detail below, the transmitted symbol x(n) 107 will be estimated from the received frequency domain signal Y(k) 125 to arrive at an estimate of the transmitted symbol X(k) 129. Using F to denote the IDF unitary transform matrix, $H_t$ to denote the time-variant circular convolution matrix such that:

$$H_t(n,l) = h(n, <n-l>_N).$$

Using the defined values: x=[x(0), x(1), . . . , x(N−1)], X=[X(0), X(1), . . . , X(N−1)] and w=[w(0), w(1), . . . ,2 (N−1)], Equation (3) may be written as:

$$Y = Fy \quad \text{Equation (4)}$$
$$= FH_t + Fw$$
$$= FH_t F^H X + Fw$$

Defining the sub-carrier coupling matrix:

$$H_d = FH_t F^H \quad \text{Equation (5)}$$

Equation (4) could be written as:

$$Y = H_d X + \overline{w}, \quad \text{Equation (6)}$$

where $\overline{w}$ is still white Gaussian noise.

With some derivation, it could be shown that $H_d(k,p) = h_d(k,k-p)$ where:

$$h_d(k,d) = \frac{1}{N} \sum_{n=0}^{N-1} \sum_{l=0}^{N_h-1} h(n,l) e^{-j\frac{2\pi}{N}(lk+dn)} \quad \text{Equation (7)}$$

Notice that $h_d(k,0)$ appears on the main diagonal, $h_d(k,1)$ appears on the first sub-diagonal, $h_d(k,-1)$ appears on the first super-diagonal and so on. In more detail, the elements on the diagonal of matrix $H_d$, $H_d(k,k)$, could be represented as $H_d(k,k) = h_d(k,k-k) = h_d(k,0)$; the elements on the first sub-diagonal, $H_d(k,k+1) = h_d(k,k-(k+1)) = h_d(k,-1)$ and the elements on the first super-diagonal, $H_d(k,k-1) = h_d(k,k-(k-1)) = h_d(k,1)$. The relationship of $h_d$ and $H_d$ is depicted in FIG. 2A. It is well known that $h_d(k,d)$ goes to 0 very quickly when |d| increases. Therefore, the sub-carriers coupling matrix $H_d$ is a banded matrix with two triangles on the upper right and lower left corners, as shown in FIG. 2B. In most OFDM systems, those sub-carriers on two sides are not used (null carriers). In those cases, the two triangles in FIG. 2B could be removed, and sub-carriers coupling matrix $H_d$ could be simplified to FIG. 2C. D=2 will be enough for most systems.

The OFDM signal may be viewed as a combination of combined sinusoidal signals when considered in the time domain. Therefore a Fast Fourier Transform (FFT) 123 may be used to convert the signal into its component frequencies on the frequency domain. When the carrier frequencies have been separated, the data may be estimated to derive the transmitted data 127.

In order to successfully isolate the carrier components, it is a basic assumption in OFDM that the carriers maintain their orthogonality. As long as the orthogonality of the carriers holds, the carriers will not interfere with each other. In a static environment, this is generally the case, but in a high mobility environment, because of the channel changing inside one OFDM symbol, the orthogonality of the carriers is not maintained and neighboring carriers begin to interfere with each other. The result is a banded carrier coupling matrix like that shown in FIG. 2B or 2C which makes the symbol estimation much more complex than a straight forward diagonal matrix as depicted in FIG. 2D. This inter-carrier interference (ICI) causes variance in the channel over a single symbol and, if not addressed, will cause an error floor. That is, the bit error rate (BER), will not improve despite a rise in the signal to noise ratio (SNR).

Compensating for ICI requires highly complex calculations, and in the case where a large number of sub-carriers are used, high dimensional arrays that require inversions are too large to be implemented in current hardware. Simple solutions that ignore ICI or only consider a nominal number of filter taps do not provide efficient and accurate estimation of the channel. It would therefore be beneficial to have an inter-carrier interference cancellation scheme that is practicable and provides an accurate estimate of the OFDM channel.

SUMMARY

A method and apparatus for estimating a time variant Orthogonal Frequency Division Multiplexing (OFDM) channel while eliminating (or reducing) Inter-carrier Interference (ICI) are disclosed, where the time variant channel matrix is estimated at channel taps using a Basis Expansion Model (BEM). The BEM method decomposes the time variant channel tap coefficients into a group of basis functions in time domain. With some derivations, the decomposition coefficients in frequency domain can be calculated since most calculations of OFDM based systems are performed in frequency domain. Coefficients are estimated using a sub-space tracking algorithm that decreases the dimensions of the coefficient matrix allowing for simpler calculation of the estimated signal. The coefficients matrix is estimated using a conjugate gradient iterative method that may be stopped after a small number of iterations to arrive at an acceptable estimation. Finally, the transmitted data is estimated, again using the conjugate gradient method iteratively, wherein the conjugate gradient method is stopped after a small number of iterations.

DETAILED DESCRIPTION

To eliminate or reduce ICI in the OFDM channel, first an accurate estimate of the banded channel matrix, Hd indicating the inter carrier interference (ICI) in the frequency domain must be made. An accurate estimate may be derived by decomposing the time variant channel taps into basis functions using a Basis Expansion Model (BEM) and then transforming the decomposed coefficients into the frequency domain using a Fast Fourier Transform (FFT).

The maximum delay spread of a channel may be reasonably assumed based on the guard interval. In general, there are hundreds to over a thousand taps in the maximum delay spread. If the BEM is used directly on that many samples, the BEM is impossible to implement in current hardware due to the high dimensional matrix inversion needed to estimate the parameters.

For example, in the Digital Video Broadcast/Terrestrial (DVB-T) system, the most widely used guard intervals contain 1024 or 2048 samples. If the maximum delay spread was set to half of the guard interval, coefficients for about 512 or 1024 channel taps would have to be calculated. If those channel taps were decomposed using 3 basis functions, it would be necessary to estimate 512×3 or 1024×3, 1536 or 3072 parameters. Therefore, a matrix inversion with dimensions 1536×1536 or 3072×3072 would need to be performed to estimate the channel. However, because it is known that only about 10 channel taps are used in most channel profiles, if it were known when those channel taps occurred the dimensions could be reduced drastically to 10×3, 30 parameters. A sub-space tracking algorithm is used to track the channel delay subspace, or delay of each channel tap. The sub-space tracking algorithm will provide an accurate enough estimation, even in a high mobility environment as the delay subspace varies much slower than the amplitude and phase of each channel tap.

To reduce the complexity of the calculations even further, a conjugate gradient (CG) method is performed to estimate the coefficients without performing a complete matrix inversion. The CG method is done iteratively and is stopped after a predetermined number of iterations, after which an acceptable estimation is achieved.

After the banded $H_d$ channel matrix is estimated as described above, the CG method is used again to estimate the transmitted data X from $H_d$ and the received data Y. Iteratively solving for X and stopping after several iterations, drastically reduces the complexity of estimating X.

Figure 3:
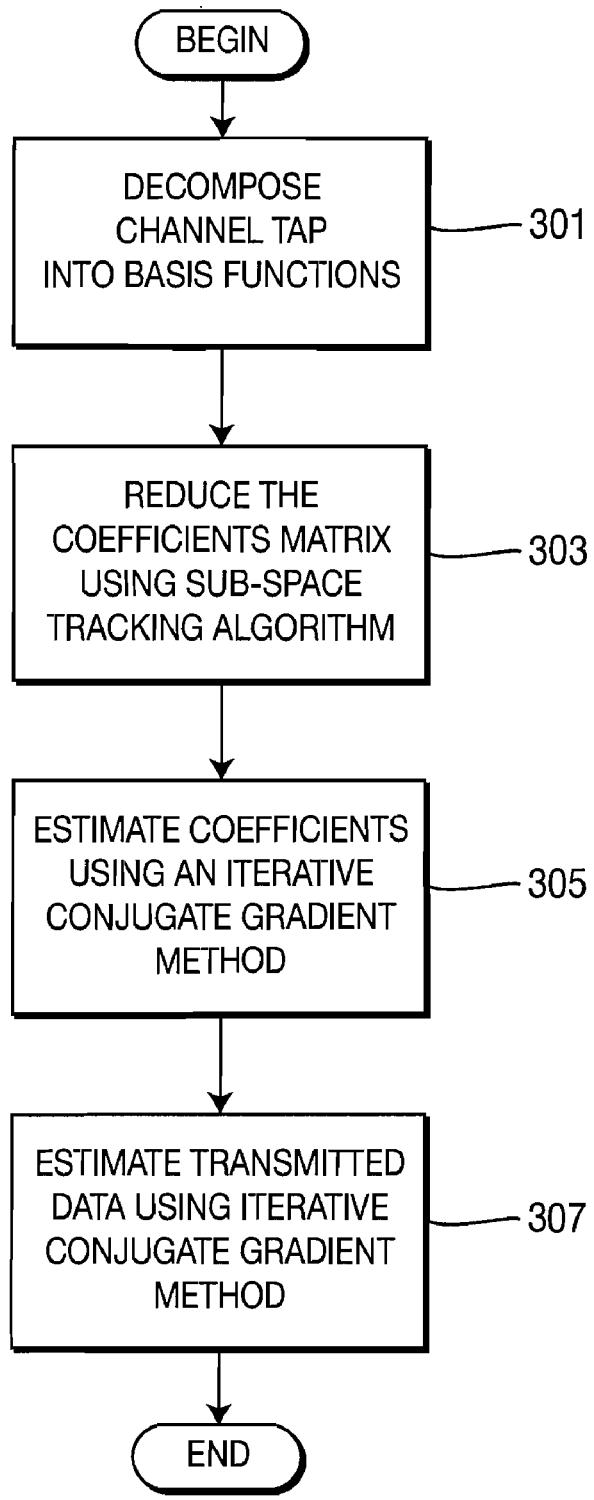
FIG. 3 is a flow diagram depicting a method of eliminating ICI in OFDM channel estimation.

Referring to FIG. 3, a simplified flow diagram of a method 300 of estimating an OFDM channel in a high mobility environment is shown. The time variant channel may be seen a series of channel taps in the time domain that represents the delays caused in the fading multi-path channel.

In a wireless communication system where a communicating wireless transmit/receive unit (WTRU) is moving while communicating, the motion of the WTRU relative to a base station to which it is connected (i.e., in wireless communication) causes changes in transmitted or received signals based on the Doppler affected properties of the signal. Changing angles of the WTRU with relation to the base stations, as well as reflections off of obstacles, cause reflected signals to reach the intended recipient at slightly different times than signals that are received by the recipient in a straight-line path.

As a result, channel taps within the communication signal vary with time and estimation is required to properly interpret the time-varying signal. Statistically, these channel taps are estimated based on certain physical properties such as delays, phases, frequencies or angles of arrival for a given signal path. Pilot signals, known to both the transmitter and receiver provide a context in which a received signal may be estimated, however, placing pilots optimally in a frequency domain communication system like orthogonal frequency division multiplexing (OFDM), becomes difficult due to interference between sub-carriers in the OFDM signal known as inter-carrier interference (ICI). When ICI occurs, a receiver cannot find a sub-carrier that relies solely on pilot symbols and is not contaminated by neighboring data symbols. For this reason, many existing solutions view the frequency domain channel as a purely diagonal matrix, which ignores ICI altogether, or strictly banded. These assumptions create large estimation errors, particularly in channels with a time-varying channel due to high mobility.

Through the use of a basis expansion model (BEM), the OFDM channel may be viewed as a full matrix which represents a true depiction of the communication channel including any ICI that may be occurring. The channel taps in the time-varying channel are decomposed using basis functions into the frequency domain as indicated in block 301.

The resulting channel matrix in the frequency domain represents a true representation of the channel including the ICI. However, the dimensions of the resulting channel matrix are too large to be calculated directly. The dimensions of the matrix are to be reduced using a low-rank adaptive filter such as a sub-space tracking algorithm as shown in block 303 to create an estimate of the channel that is calculable with respect to the computational abilities of present hardware without degrading the useful accuracy of the channel matrix. The channel matrix is comprised of individual contributions, each contribution representing a specific multi-path component of the received signal. Each multi-path component is characterized by a slowly varying delay and a rapidly varying complex amplitude. Through the use of a delay subspace tracking algorithm, the explicit delays of the channel taps need not be calculated. An unstructured tracking of the slow variations in the delay sub-space is performed separately from the estimation of the fast varying complex amplitudes. In a structured matrix, all delays are considered separately creating a vector for each delay. By using an unstructured basis in place of the structured matrix, all the delays for the system are combined into the same basis vector. Therefore the number of delays/basis vectors is reduced.

An iterative Conjugate Gradient (CG) algorithm is used to solve a system of N linear equations, wherein an exact solution is reached after N iterations of the algorithm. While an exact solution is only reached after N iterations are performed, the iterative CG method provides an approximate solution at each iteration. The approximate solution improves at each iteration. Therefore, an iterative CG method may be stopped after less than N steps if the exact solution is not required.

When computing the BEM coefficients matrix, the use of the sub-space tracking algorithm reduces the dimensional complexity of the delays to be calculated. In block 305, a reduced rank wiener filter such as the conjugate gradient algorithm is used to complete the calculation of the BEM coefficients. After a few iterations of the CG algorithm, the result approximate solution will be accurate enough to use to derive the transmitted data.

After the BEM coefficients have been estimated and the sub-carrier coupling matrix is calculated, the transmitted data is estimated from the knowledge of the received data and the sub-carrier coupling matrix. The direct calculation of the transmitted data requires a matrix inversion that is too large to be calculated directly, therefore an iterative CG algorithm is used to estimate the transmitted data as shown in block 307. Using the iterative CG algorithm for a limited number of iterations reduces the complexity of the calculations and provides an adequate estimation of the transmitted data based on the previously estimated sub-carrier coupling matrix and the received data.

With respect to step 301 described above, it is known that the time series could be decomposed with a group of basis functions. As in Fourier Transform, we can decompose the time series $h_l(n)$ with basis functions:

$$\{e^{-j\frac{2\pi}{N}qn}\}, \text{ using } \lambda_q = \frac{1}{\sqrt{N}}\sum h_l(n)e^{-j\frac{2\pi qn}{N}}. \quad \text{Equation (8)}$$

If only several q are kept, it will result in the truncated decomposition $$\{\lambda_q\}_{q=-Q}^{Q}.$$

This is an illustration of what the BEM model does if complex exponential functions are used as the basis functions. Since every channel tap could be decomposed in this way, $\{\lambda_q(l)\}$ is used for those coefficients and $h(n,l)$ is used instead of $h_l(n)$ to represent the channel tap with a delay of l samples. Using $u_q$ to denote the basis functions, and $\lambda_q$ to denote the coefficients, the channel taps could be represented as:

$$h(n, l) = \sum_{q=-Q/2}^{Q/2} u_q(n)\lambda_q(l) \quad \text{Equation (9)}$$

Examples of such basis functions are complex exponential (CE) functions with $$u_q(n) = e^{-j\frac{2\pi}{N}qn},$$

generalized complex exponential (CGE) functions with $$u_q(n) = e^{-j\frac{2\pi}{KN}qn},$$

polynomial (P) functions with $u_q(n)=(n-N/2)^q$, and so on. Their corresponding models are called CE-BEM, GCE-BEM, P-BEM, respectively. The CE-BEM is exactly the same as the Fourier decomposition and the P-BEM with $q\in\{0,1\}$ is the linear approximation model. Although any BEM model could be used, one preferred embodiment is the GCE-BEM model with $q\in\{-1,0,1\}$ and K=2.

After substituting Equation (9) into Equation (7), it is straight forward to derive the BEM model in the frequency domain:

$$h_d(k, d) = \sum_{q=-Q/2}^{Q/2} U_q\Lambda_q(k); \quad \text{Equation (10)}$$

where $U_q(d)=Fu_q(n)$, only non-zero at $|d|\leq D$, is the Discrete Fourier Transform (DFT) of $u_q(n)$ and $\Lambda_q(k)=F_{N_k}\lambda_q(l)$ is the DFT of $\lambda_q(l)$.

With the BEM model, to estimate the channel is equivalent to estimating the BEM coefficients $\lambda_q(l)$. Consider an initial estimation of transmitted data $X_0$, which could be the hard de-mapping using Minimum Mean Square Error (MMSE) equalizer or simply Least Squares (LS) equalizer. For clarity, $\bar{w}$ in Equation (6) may be ignored at first, which will yield the LS estimation versus the wiener estimation with $\bar{w}$. The LS estimation and the wiener estimation have the same computational complexity and the algorithm described below could be used for both estimations with small changes. Substituting Equation (10) into Equation (6) yields:

$$Y(k) = \sum_{p=k-D}^{k+D} H_d(k, p)X(p) \qquad \text{Equation (11)}$$

$$= \sum_{p=k-D}^{k+D} \sum_{q=-Q/2}^{Q/2} U_q(p-k)\Lambda_q(k)X(p)$$

$$= \sum_{p=k-D}^{k+D} \sum_{q=-Q/2}^{Q/2} U_q(p-k)\left(\sum_{l=0}^{N_h-1} F(p, l)\lambda_q(l)\right)X(p)$$

$$= \sum_{q=-Q/2}^{Q/2} \sum_{l=0}^{N_h-1} \sum_{p=k-D}^{k+D} U_q(p-k)X(p)F(p, l)\lambda_q(l)$$

Denoting vector $\lambda=\{\lambda_q(l)\}$, ($\lambda(qN_h+l)=\lambda_q(l)$), Equation (10) may be written as:

$$Y = A\lambda \qquad \text{Equation (12)}$$

and $$A(k, qN_h + l) = \sum_{p=k-D}^{k+D} U_q(p-k)X(p)F(p, l) \qquad \text{Equation (13)}$$

To solve linear equations in Equation (12), if $QN_h$ equations can be collected for Equation (12), those $QN_h$ equations should be able to be solved with $QN_h$ variables. This method is not stable because most of the time the resulting coefficients matrix is ill-conditioned. Equation (12) may be written into quadratic programming (QP) format as:

$$\min_{\lambda}(Y - A\lambda)^H(Y - A\lambda) \qquad \text{Equation (14)}$$

This will yield a robust estimation of $\lambda$:

$$\lambda = (A^H A)^{-1} A^H Y \qquad \text{Equation (15)}$$

A high dimensional matrix inversion is needed to estimate $\lambda$ using Equation (14) directly, which prevents it from being implemented in a real-world implementation.

The multi-path fading channel could be modeled as several taps if the paths could be estimated accurately. For example, in the 6-tap typical urban (TU6) channel model, only 6 taps are needed to represent the channel model. Suppose L is the number of distinct paths and $\tau_i$ is the delay of path l. The received signal after channel in Equation (2) could be written as:

$$y_d(n) = \sum_{l=0}^{L-1} h(n, l)x_d(n - \tau_l) + w(n), \qquad \text{Equation (16)}$$

$$0 \leq n \leq N$$

and Equation (13) could be re-written into:

$$A(k, qL + l) = \sum_{p=k-D}^{k+D} U_q(p-k)X(p)F_L(p, l) \qquad \text{Equation (17)}$$

where $F_L$ is a N*L matrix by picking those columns corresponding to $\tau_l$ from the unitary DFT matrix. With the notation $F_L$, the DFT of $\lambda_q(l)$ may be written as $\Lambda_q(k)=F_L\lambda_q(l)$.

Many algorithms may be used to estimate the channel delays. Some of them are based on the IFFT of channel response, and some of them are based on the time-invariant character inside the received signal, like estimation of signal parameters via rotational invariant techniques (ESPRIT). However, although these algorithms will give the path delay information, the performance is still not acceptable if the $F_L$ is formulated with those estimated path delays.

The channel may be estimated with low complexity by tracking the channel delay sub-space. The low-rank adaptive filter (LRAF) algorithm is a sub-space tracking algorithm. The sub-space spanned by the projection matrix $\Pi$ in the LRAF algorithm will converge to the same sub-space span as the matrix $F_L$. The projection matrix $\Pi$ in the LRAF algorithm may be used to replace the matrix $F_L$ resulting in:

$$\Lambda_q(k)=\Pi\overline{\lambda_q}(l) \qquad \text{Equation (18)}$$

and $$\overline{\lambda_q}(l)=\Pi^H\Lambda_q(k) \qquad \text{Equation (19)}$$

Since there is no need to distinguish between the $[\Pi,\bar{\lambda}]$ and $[F_L,\lambda]$ in the algorithm, $F_L$ may be used as the DFT matrix, which is actually the projection matrix from the sub-space tracking algorithm, and $\lambda$ as the coefficients of the BEM model, which is actually $\bar{\lambda}$. Although the LRAF is chosen for this embodiment, other sub-space tracking algorithms such as the projection approximation sub-space tracking (PAST) algorithm may be used.

With respect to step 303 described above, the sub-space tracking algorithm, the dimension of $\lambda$ may be reduced from $N_hQ$ to LQ. $N_h$ is the maximum delay of all paths, which is not easy to estimate. If it is estimated as half of the guard interval, for instance, in the digital video broadcast—terrestrial/handheld (DVB-T/H) system, which uses 8 k sub-carriers, for 8 k mode with a ⅛ guard interval, $N_h=8,192116=512$. In the sub-space tracking algorithm, it is only necessary to set L=8 for 8 distinct paths without knowledge of the path delays. The dimension is significantly reduced with the sub-space tracking algorithm. Although the dimension is reduced drastically, from 512 to 8, a (LQ×LQ) matrix inversion still needs to done when solving the problem of Equation (12) or (14) with Equation (15).

With respect to steps 305 and 307 described above, the conjugate gradient (CG) algorithm is widely used in solving linear equations and has been proven to be equivalent to the reduced rank wiener filter. For estimating the coefficients matrix, the conjugate gradient method is used as an iterative method to solve Equation (12) or (14) in LQ iterations. Since the result after Titerations will be a good enough approximation, the reduced rank wiener filter implemented in conjugate gradient methods is a normal CG algorithm, but the computation is stopped after T iterations. During each iteration, the CG algorithm will need to calculate the matrix times a vector, so the complexity for each iteration is PLQ, where P is the number of Y used in the estimation. T set to 6 to 8 iterations will be enough. Because there are only LQ parameters to estimate, not every Y needs to be used in the estimation. To improve performance, only pilots are used in estimating $\lambda$. The general flow of CG algorithm for problem Ax=b with initial solution $x_0$ is:

$\gamma_0 := b - Ax_0$
$p_0 := \gamma_0$
$k := 0$
repeat
$\alpha_k := \dfrac{\gamma_k^T \gamma_k}{p_k^T A p_k}$
$x_{k+1} := x_k + \alpha_k p_k$
$\gamma_{k+1} := \gamma_k - \alpha_k A p_k$
if $k == k_{max}$ then exit loop;
$\beta_k := \dfrac{\gamma_{k+1}^T \gamma_{k+1}}{\gamma_k^T \gamma_k}$
$p_{k+1} := \gamma_{k+1} + \beta_k p_k$
a.
$k := k + 1$
end repeat
The result is $x_{k+1}$ After the BEM coefficients $\lambda$ are estimated, the sub-carriers coupling matrix $H_d$ may be calculated. Equation (6) may now be used to estimate transmitted data X with $H_d$ and Y both being known. As was done for Equation (11), another QP problem may be formulated as:

$\min(Y-H_d X)^H (Y-H_d X),$ \hfill Equation (20)

the solution to Equation (20) is:

$X = (H_d^H H_d)^{-1} H_d^H Y$ \hfill Equation (21)

It is impossible to use Equation (21) directly to derive X because the matrix inversion cannot be implemented in an actual system because of hardware limitations. With the aid of the conjugate gradient algorithm, Equation (20) could be solved with complexity T×N×(2D+1). T set to 6 or 8 and D set to 2 is enough for most cases. This drastically reduces the complexity of the algorithm.

Figure 1:
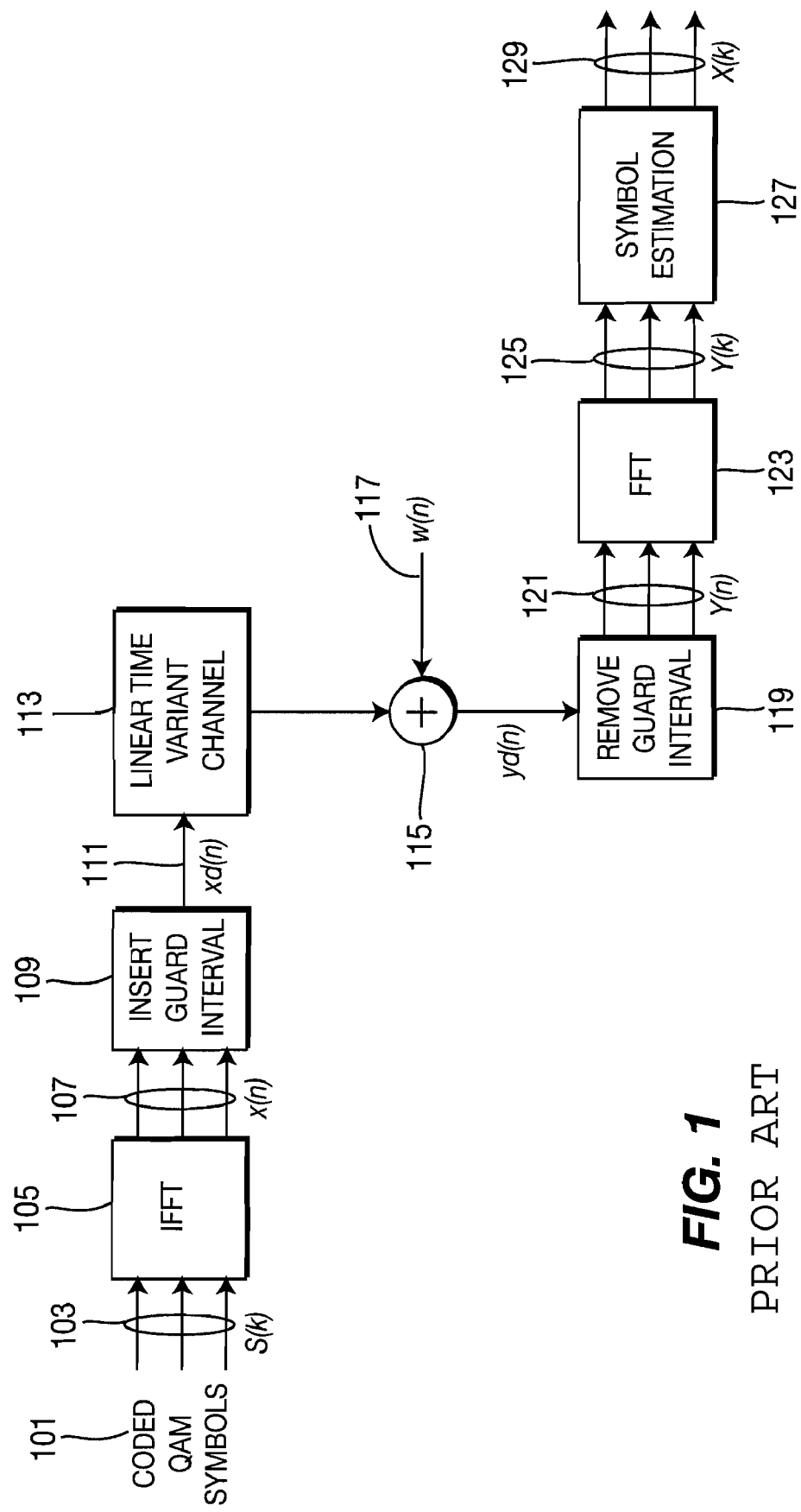
FIG. 1 is a block diagram of an overview of a conventional Orthogonal Frequency Division Multiplex (OFDM) system.
Figure 2A:
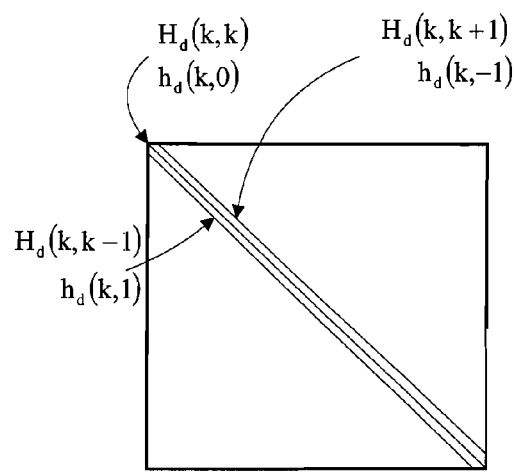
FIG. 2A is a graphical representation of the relationship between $h_d$ and $H_d$.
Figure 2B:
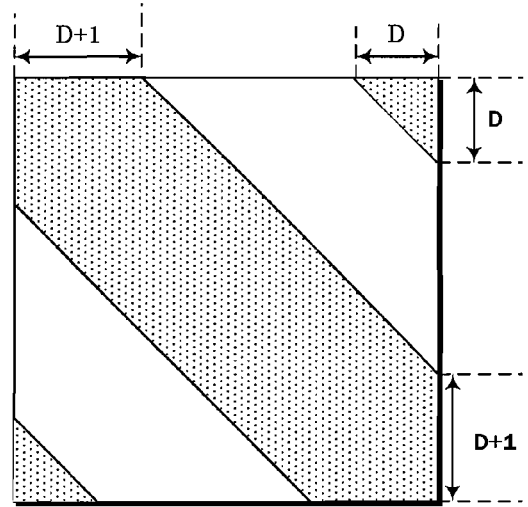
FIG. 2B is a graphical representation of a time variant OFDM channel matrix indicating Inter-Carrier Interference (ICI).
Figure 2C:
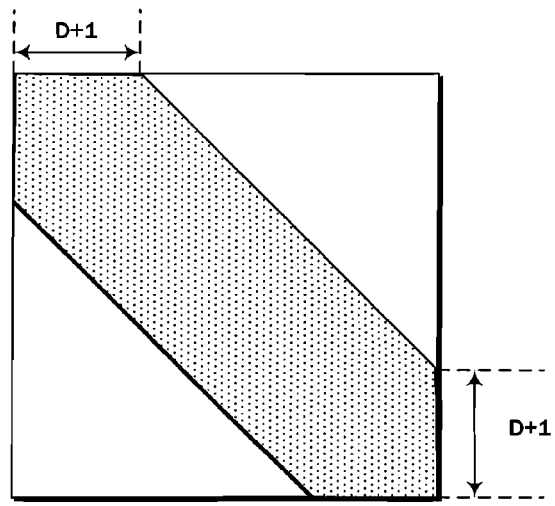
FIG. 2C is a graphical representation of a simplified time variant OFDM channel matrix.
Figure 2D:
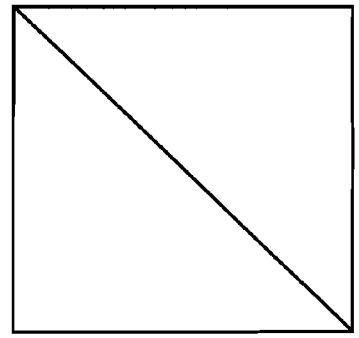
FIG. 2D is a graphical representation of a static OFDM channel matrix showing points on the main diagonal.
Figure 4:
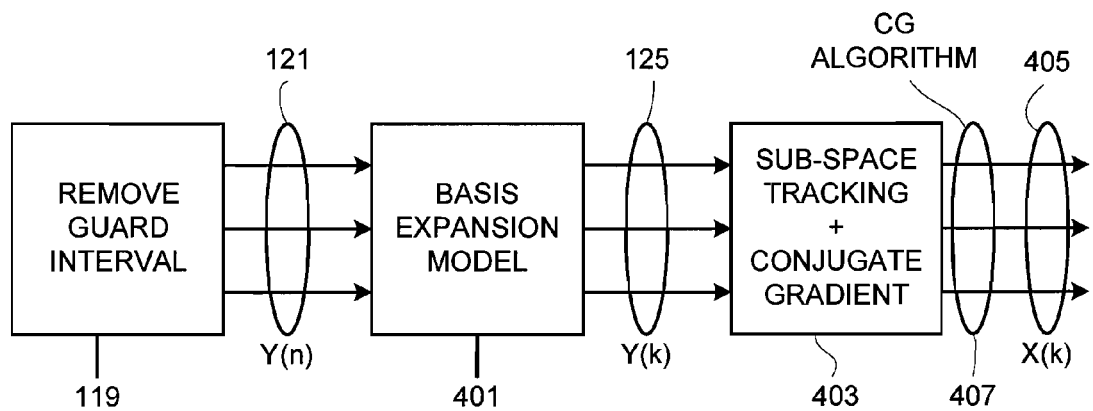
FIG. 4 is a block diagram of an apparatus configured to estimate an OFDM channel taking ICI into account.

FIG. 4 shows the receiving processes that correspond to the FFT 123 and symbol estimation 127 explained above regarding FIG. 1, configured to perform channel estimation according to the method described above in FIG. 3. After the time-varying channel signal is received, the guard interval is removed (119) leaving just the time domain signal Y(n) 121. The time domain signal 121 is then decomposed onto a series of basis function using a basis expansion model 401. This decomposition results in a signal in the frequency domain Y(k) 125. The frequency domain signal 125 is estimated into a channel matrix. The dimensions of the channel matrix, including the ICI experienced on the channel are reduced by applying a sub-space tracking algorithm and the lower dimension matrix is solved through an iterative conjugate gradient algorithm 403 that is stopped after a pre-determined number of iterations to arrive at an estimated value that represents an acceptable level of accuracy. The transmitted data X(k) 405 is then estimated from known pilot symbols, and the estimated channel matrix estimated in step 403. To solve for the transmitted symbol, a second conjugate gradient algorithm 407 is applied and halted after a predetermined number of iterations to arrive at an acceptable estimation of the transmitted symbol, while eliminating the effects of ICI.

Figure 5:
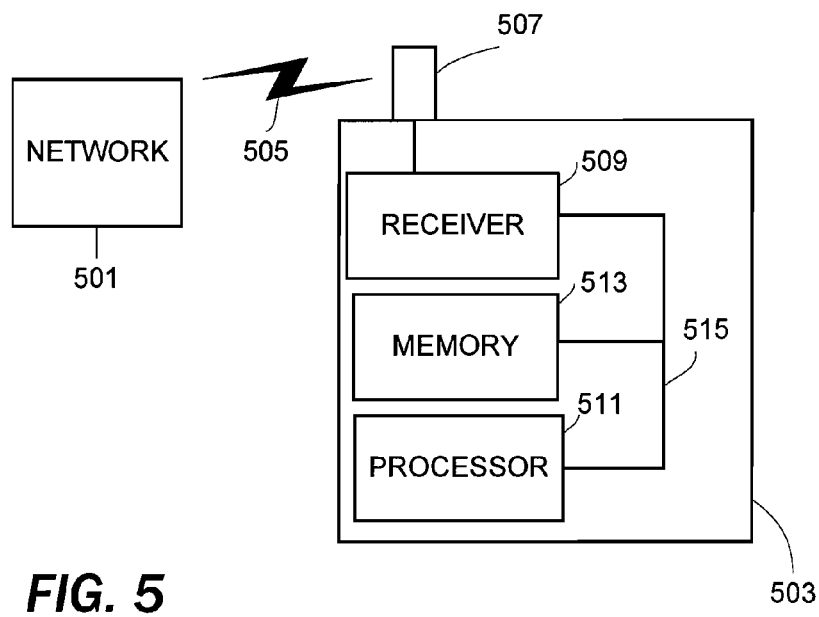
FIG. 5 shows a wireless device configured in accordance with the present invention.

FIG. 5 is a functional diagram of a wireless device 503 configured in accordance with the present invention. A time-varying OFDM signal 505 is transmitted by a network 501. The signal 505 is received by the wireless device 503 through an antenna 507 and is received by the receiver 509. When the signal 505 is received by the receiver 509, the signal 505 may include ICI that results from, for example, the mobility of the wireless device 503 relative to the transmitting source in the network 501. The received signal 505 is processed by a processor 511 that is connected to a memory 513. The receiver 509, the processor 511 and the memory 513 are coupled to each other through a bus 515. The memory 513 may contain machine readable instructions that when executed by the processor 511 process the received signal 505. The received signal 505 is decomposed using a basis expansion model, to arrive at a frequency domain signal. The channel matrix is then estimated, taking ICI into account. The estimated channel matrix is then reduced in dimension when the processor 511 executes instructions from memory 513 to apply a sub-space tracking algorithm to estimate the channel matrix. The channel coefficients are calculated from the lower dimension channel matrix by the processor 511 executing instructions stored in memory 513 to perform an iterative conjugate gradient algorithm that is halted after a predetermined number of iterations. The estimated channel including the estimated coefficients are applied to the known received signal, the processor 511 executes instructions from the memory 513 to perform a second iterative conjugate gradient algorithm that is halted after a predetermined number of iterations to arrive at an acceptable estimation of the originally transmitted symbol.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAS) circuits, any other type of integrated circuit (IC), and/or a state machine.

What is claimed is:

1. A method of estimating an Orthogonal Frequency Division Multiplex (OFDM) channel, implemented in a wireless communications device, the method comprising:
   estimating, by the wireless communications device, a channel matrix using a basis expansion model (BEM);
   reducing, by the wireless communications device, a dimension of the estimated channel matrix by computing a coefficients matrix of the estimated channel matrix using a sub-space tracking algorithm;
   estimating, by the wireless communications device, each coefficient in the coefficients matrix using an iterative conjugate gradient algorithm, wherein a number of iterations performed is less than a number of variables to be solved; and estimating, by the wireless communications device, a transmitted symbol based on the estimated coefficient and a received symbol.

2. The method of claim 1 further comprising using, by the wireless communications device, a second iterative conjugate gradient algorithm to estimate the transmitted symbol, wherein the number of iterations performed is less than a second dimension of a vector being solved.

3. The method of claim 1, wherein the BEM uses complex exponential functions as basis functions.

4. The method of claim 2, wherein the estimation of the coefficients matrix comprises performing 6-8 iterations of the first conjugate gradient algorithm.

5. The method of claim 2, wherein the estimation of the transmitted symbol comprises performing 6-8 iterations of the second conjugate gradient algorithm.

6. The method of claim 2, wherein the BEM uses polynomial functions as basis functions.

7. The method of claim 6, wherein the estimation of the coefficients matrix comprises performing 6-8 iterations of the first conjugate gradient algorithm.

8. The method of claim 7, wherein the estimation of the transmitted symbol comprises performing 6-8 iterations of the second conjugate gradient algorithm.

9. A wireless communications device comprising:
a receiver configured to receive a transmission in an orthogonal frequency division multiplex (OFDM) channel; and
a processor in communication with the receiver, the processor configured to decompose a time variant linear channel transmission into a series of basis functions using a basis expansion model (BEM), project a sub-space of the OFDM channel transmission into the frequency domain using a sub-space tracking algorithm, wherein the sub-space tracking algorithm reduces a dimension of a computed coefficients matrix of the basis functions, estimate each of the coefficients of the coefficients matrix using an iterative conjugate gradient algorithm, wherein the iterative conjugate gradient algorithm performs a number of iterations less than the number of equations to be solved, and estimate a transmitted symbol based on the estimated coefficient and a received symbol, using a second iterative conjugate gradient algorithm wherein the second conjugate gradient algorithm performs a number of iterations less than a second dimension of a vector being solved.

10. The wireless communications device of claim 9, wherein the BEM uses complex exponential functions as basis functions.

11. The wireless communications device of claim 10, wherein the first iterative conjugate gradient algorithm performs 6-8 iterations.

12. The wireless communications device of claim 10, wherein the second iterative conjugate gradient algorithm performs 6-8 iterations.

13. The wireless communications device of claim 9, wherein the BEM uses generalized complex exponential functions as basis functions.

14. The wireless communications device of claim 9, wherein the BEM uses polynomial functions as basis functions.

15. The wireless communications device of claim 14, wherein the first iterative conjugate gradient algorithm performs 6-8 iterations.

16. The wireless communications device of claim 14, wherein the second iterative conjugate gradient algorithm performs 6-8 iterations.

17. A non transitory machine readable storage medium containing a set of instructions comprising:
a basis expansion model (BEM) code segment that when executed by a processor, decomposes an OFDM symbol into a series of basis functions using a BEM algorithm;
a sub-space tracking algorithm code segment that when performed by the processor, reduces a dimension of a computed coefficients matrix of the basis functions using a sub-space tracking algorithm;
a first conjugate gradient (CG) code segment that when performed by the processor, estimates each of the coefficients of the coefficients matrix using a first iterative conjugate gradient algorithm, wherein the first iterative conjugate gradient algorithm is halted after a number of iterations that is less than the number of equations to be solved; and
a second CG code segment that when performed by the processor, estimates a transmitted OFDM symbol, based on the estimated coefficient and a received symbol, using a second iterative conjugate gradient algorithm, wherein the second conjugate gradient algorithm is halted after a number of iterations that is less than a second dimension of a vector that is being solved.

18. The non transitory machine readable medium of claim 17, wherein the BEM uses complex exponential functions as basis functions.

19. The non transitory machine readable medium of claim 18, wherein the first iterative conjugate gradient algorithm is halted after 6-8 iterations.

20. The non transitory machine readable medium of claim 18, wherein the second iterative conjugate gradient algorithm is halted after 6-8 iterations.

21. The non transitory machine readable medium of claim 17, wherein the BEM uses generalized complex exponential functions as basis functions.

22. The non transitory machine readable medium of claim 21, wherein the first iterative conjugate gradient algorithm is halted after 6-8 iterations.

23. The non transitory machine readable medium of claim 21, wherein the second iterative conjugate gradient algorithm is halted after 6-8 iterations.

24. The non transitory machine readable medium of claim 17, wherein the BEM uses polynomial functions as basis functions.

25. The non transitory machine readable medium of claim 24, wherein the first iterative conjugate gradient algorithm is halted after 6-8 iterations.

26. The non transitory machine readable medium of claim 24, wherein the first iterative conjugate gradient algorithm is halted after 6 iterations.

27. The non transitory machine readable medium of claim 24, wherein the second iterative conjugate gradient algorithm is halted after 6-8 iterations.

28. The non transitory machine readable medium of claim 24, wherein the second iterative conjugate gradient algorithm is halted after 6 iterations.

29. A non transitory machine readable storage medium containing a first set of instructions, when executed by a processor, allow the processor to:
decompose an OFDM symbol into a series of basis functions using a basis expansion model (BEM);
reduce a dimension of a computed coefficients matrix of the basis functions using a sub-space tracking algorithm;

estimate each of the coefficients of the coefficients matrix using a first iterative conjugate gradient algorithm, wherein the first iterative conjugate gradient is halted after a number of iterations that is less than the number of equations to be solved;

estimate a transmitted OFDM symbol, based on the estimated coefficient and a received symbol, using a second iterative conjugate gradient algorithm, wherein the second conjugate gradient algorithm is halted after a number of iterations that is less than a second dimension of a vector that is being solved.

* * * * *

UNITED STATES PATENT AND TRADEMARK OFFICE
CERTIFICATE OF CORRECTION

| | | |
|---|---|---|
| PATENT NO. | : 8,054,917 B2 | Page 1 of 1 |
| APPLICATION NO. | : 12/170898 | |
| DATED | : November 8, 2011 | |
| INVENTOR(S) | : Huang et al. | |

It is certified that error appears in the above-identified patent and that said Letters Patent is hereby corrected as shown below:

IN THE CLAIMS

Column 13, Line 3, Claim 29, after "conjugate gradient" insert therefore --algorithm--.

Signed and Sealed this
Sixth Day of March, 2012

David J. Kappos
*Director of the United States Patent and Trademark Office*